United States Patent [19]
Griffin et al.

[11] Patent Number: 5,978,789
[45] Date of Patent: Nov. 2, 1999

[54] EFFICIENT HYPOTHETICAL QUERY EVALUATION IN A DATABASE SYSTEM

[75] Inventors: Timothy G. Griffin, Berkeley Heights; Richard Baxter Hull, Morristown, both of N.J.

[73] Assignee: Lucent Technologies Inc., Murray Hill, N.J.

[21] Appl. No.: 08/852,652

[22] Filed: May 7, 1997

[51] Int. Cl.$^6$ ............................................. G06F 17/30
[52] U.S. Cl. ................................................ 707/2; 706/51
[58] Field of Search .................... 707/2; 706/51

[56] References Cited

U.S. PATENT DOCUMENTS

| | | | |
|---|---|---|---|
| 5,276,775 | 1/1994 | Meng | 706/511 |
| 5,393,062 | 2/1995 | Cember | 273/153 R |
| 5,418,942 | 5/1995 | Krawchuk et al. | 707/3 |
| 5,745,889 | 4/1998 | Burrows | 707/2 |
| 5,778,355 | 7/1998 | Boyer et al. | 707/2 |

OTHER PUBLICATIONS

M. Abadi, L. Cardelli, P. Curien and J. Levy, "Explicit Substitutions," Journal of Functional Programming, 1(4):375–416, 1991.

M. Benedikt, T. Griffin and L. Libkin, "Verifiable Properties of Database Transactions," Proc. ACM Symp. on Principles of Database Systems, pp. 117–127, 1991.

A.J. Bonner, "Hypothetical Datalog: Complexity and Expressibility," Theoretical Computer Science, 76:3–51, 1990.

A.J. Bonner, "The Logical Semantics of Hypothetical Rulebases with Deletion," Journal of Logic Programming, 1995.

G. Dowek, T. Hardin and C. Kirchner, "Higher–Order Unification via Explicit Substitutions," IEEE Symposium on Logic in Computer Science, pp. 366–374, 1995.

M. Doherty, R. Hull and M. Rupawalla, "Structures for Manipulating Proposed Updates in Object–Oriented Databases," Proc. ACM SIGMOD Symp. on the Management of Data, pp. 306–317, 1996.

G. Graefe and D.J. DeWitt, "The EXODUS Optimizer Generator," Proc. ACM SIGMOD Symp. on the Management of Data, pp. 160–172, 1987.

(List continued on next page.)

*Primary Examiner*—Wayne Amsbury

[57] ABSTRACT

A hypothetical query in a database system is transformed using algebraic equivalences involving explicit substitutions so as to produce one or more equivalent queries which can be evaluated more efficiently than the original hypothetical query. The hypothetical query may be of the form Q when {U} where Q is a relational algebra query and U is an update expression. The value assigned to the hypothetical query in a database state DB is the value that Q would return in the database state reached from DB by executing update U. One or more explicit substitutions are used to represent hypothetical database state changes, and algebraic equivalences involving the explicit substitutions are applied to the hypothetical query in order to generate at least one additional query which is equivalent to the hypothetical query. Several equivalent queries may be generated, and their estimated computation times compared, in order to select a particular equivalent query for direct evaluation. The use of explicit substitutions to represent hypothetical database state changes allows when constructs or other similar hypothetical programming constructs to be eliminated from the equivalent query. The evaluation process may be facilitated by configuring the original hypothetical query into an evaluable normal form, such that one or more hypothetical state expressions of the query correspond to explicit substitutions, and the hypothetical query does not utilize a composition operator. The selected equivalent query can be evaluated using a purely lazy evaluation strategy, or a hybrid lazy-eager evaluation strategy.

50 Claims, 6 Drawing Sheets

R when ε ≡ Q, if ε ∈ ε$_{ra}$ and Q/R ∈ ε
R when ε ≡ R, if ε ∈ ε$_{ra}$ and R has no binding in ε
{t} when η ≡ {t}
(unary_op(Q)) when η ≡ unary_op (Q$_1$ when η)
(Q$_1$ binary_op Q$_1$) when η ≡ (Q$_1$ when η) binary_op (Q1 when η)

*push-when-into-algebra-expressions*

{{skip}} ≡ { }
{{ins(R,Q)}} ≡ {(R ∪ Q)R}
{{ins(R,Q)}} ≡ {(R - Q)R}
{{U$_1$; U$_2$}} ≡ {{U$_1$}} # {{U$_2$}}

*convert-to-explicit-substitutions*

(Q when η$_1$) when η$_2$ ≡ Q when (η$_2$ # η$_1$)

*replace-nested-when*

OTHER PUBLICATIONS

S. Ghandeharizadeh et al., "On Implementing a Language for Specifying Active Database Execution Models," Proc. of Intl. Conf. on Very Large Data Bases, pp. 441–454, 1993.

S. Ghandeharizadeh, R. Hull and D. Jacobs, "Heraclitus: Elevating Deltas to be First–Class Citizens in a Database Programming Language," ACM Trans. on Database Systems, 21(3): 370–426, 1996.

D.M. Gabbay and U. Reyle, "N–Prolog: An Extension of Prolog with Hypothetical Implications. I" Journal of Logic Programming, 1(4):319–355, 1984.

D.M. Gabbay, "N–Prolog: An Extension of Prolog with Hypothetical Implications. II: Logical Foundations and Negation as Failure" Journal of Logic Programming, 2(4):251–283, 1985.

G. Graefe, "Query Evaluation Techniques for Large Databases," ACM Computing Surveys, 25(2):73–170, 1993.

D. Gries, "The Science of Programming," Ch. 7, pp. 108–113, Springer–Verlag, 1981.

S. Horowitz and T. Reps, "The Use of Program Dependence Graphs in Software Engineering," Proceedings of the 14th International Conference on Software Engineering, 1992.

J.R. Hindley and J.P. Seldin, "Introduction to Combinators and $\lambda$–Calculus," Cambridge University Press, 1986.

P. Lescanne, "From $\lambda\sigma$ to $\lambda v$—A Journey Through Calculi of Explicit Substitutions," ACM SIGPLAN–SIGACT Symposium on Principles of Programming Languages (POPL), pp. 60–69, 1994.

J.W. Lloyd, "Foundations of Logic Programming," Second Edition, pp. 20–22, Springer–Verlag, Berlin, 1987.

X. Qian, "An Axiom System of Database Transactions," Information Processing Letters, 36:183–189, 1990.

X. Qian, "The Expressive Power of the Bounded–Iteration Construct," Acta Informatica, 28(7):631–656, Oct. 1991.

Jeffrey D. Ullman, "Principles of Database and Knowledge-base Systems," vol. II, pp. 664–667, Computer Science Press, Potomac, Maryland, 1988.

J. Woodfill and M. Stonebraker, "An Implementation of Hypothetical Relations," Proc. of Intl. Conf. on Very Large Databases, pp. 157–165, Sep. 1983.

FIG. 2A

R when ε ≡ Q, if ε ∈ $\mathcal{E}_{ra}$ and Q/R ∈ ε
R when ε ≡ R, if ε ∈ $\mathcal{E}_{ra}$ and R has no binding in ε
{t} when η ≡ {t}
(unary_op(Q)) when η ≡ unary_op ($Q_1$ when η)
($Q_1$ binary_op $Q_1$) when η ≡ ($Q_1$ when η) binary_op (Q1 when η)

*push-when-into-algebra-expressions*

FIG. 2B

{{*skip*}} ≡ { }
{{*ins*(R,Q)}} ≡ {(R ∪ Q)R}
{{*ins*(R,Q)}} ≡ {(R − Q)R}
{{$U_1$; $U_2$)}} ≡ {{$U_1$}} # {{$U_2$}}

*convert-to-explicit-substitutions*

FIG. 2C

(Q when $η_1$) when $η_2$ ≡ Q when ($η_2$ # $η_1$)

*replace-nested-when*

FIG. 2D

$ε_1$ # $ε_2$ ≡ {{$P_1$ when $ε_1/S_1$, ..., $P_m$ when $ε_1/S_m$, $Q_{i_1}/R_{i_1}$, ..., $Q_{i_k}/R_{i_k}$}} where
$ε_1$ = {{$Q_1/R_1$, ..., $Q_n/R_n$}}
$ε_2$ = {{$P_1/S_1$, ..., $P_m/S_m$}}
{$R_{i_1}$, ..., $R_{ik}$} = $dom(ε_1) − dom(ε_2)$

*compute-composition*

FIG. 2E
$Q \text{ when } \varepsilon \equiv Q \text{ when } \varepsilon|_{-R}, \text{ if } R \notin \text{free}(Q)$
$Q \text{ when } \varepsilon \equiv Q \text{ when } \varepsilon|_{-R}, \text{ if } (R/R) \in \varepsilon$
$Q \text{ when } \{\ \} \equiv Q$

*substitution-simplification*

FIG. 2F
$(\eta_1 \# \eta_2) \# \eta_3 \equiv \eta_1 \# (\eta_2 \# \eta_3)$

*associativity*

$(Q \text{ when } \eta_1) \text{ when } \eta_2 \equiv (Q \text{ when } \eta_2) \text{ when } \eta_1$
if $dom(\eta_1) \cap dom(\eta_2) = dom(\eta_1) \cap free(\eta_2) = dom(\eta_2) \cap free(\eta_1) = \emptyset$

*commute-hypotheticals*

FIG. 2G

$free(Q)$ = all relation names in Q  if $Q \in \mathcal{RA}$
$free(Q \text{ when } \eta)$ = $free(\eta) \cup (free(Q) - dom(\eta))$  if $Q \in \mathcal{RA}^+$ and $\eta \in \mathcal{HS}$
$free(skip)$ = $\emptyset$
$free(ins(R,Q))$ = $free(Q)$
$free(del(R,Q))$ = $free(Q)$
$free((U_1;U_2))$ = $free(U_1) \cup (free(U_2) - dom(U_1))$
$free(\{Q_1/R_1, ..., Q_n/R_n\})$ = $\cup \{free(Q_i) \mid i \in [1, n]\}$
$free(\{\{U\}\})$ = $free(U)$
$free(\eta_1 \# \eta_2)$ = $free(\eta_1) \cup (free(\eta_2) - dom(\eta_1))$

FIG. 3A $dom(Q)$ = $\emptyset$  Q a query expression
$dom(skip)$ = $\emptyset$
$dom(ins(R,Q))$ = $R$
$dom(del(R,Q))$ = $R$
$dom((U_1;U_2))$ = $dom(U_1) \cup dom(U_2)$
$dom(\{Q_1/R_1, ..., Q_n/R_n\})$ = $\{R_1, ..., R_n\}$
$dom(\eta_1 \# \eta_2)$ = $dom(\eta_1) \cup dom(\eta_2)$
$dom(\{\{U\}\})$ = $dom(U)$

FIG. 3B $filter_1(R, E)$ = $\begin{cases} E(R) & R \in dom(E) \\ DB(R) & R \notin dom(E) \end{cases}$
$filter_1(u\_op(Q), E)$ = $u\_op(filter_1(Q, E))$
$filter_1(Q_1 \, b\_op \, Q_2, E)$ = $filter_1(Q_1, E) \, b\_op \, filter_1(Q_2, E)$
$filter_1(\{\{Q_1/R_1, ..., Q_n/R_n\}\}, E)$ = $\{filter_1(Q_1, E)/R_1, ..., filter_1(Q_n, E)/R_n\}$
$filter_1(Q \text{ when } \varepsilon, E)$ = $filter_1(Q, E \, ! \, filter_1(\varepsilon, E))$

FIG. 5

$filter_2(Q_v[S_1, ..., S_m, R_1, ..., R_k], E) =$
　　$let\ S_1 = filter_2(T_1, E)\ in$
　　　．
　　　．
　　　．
　　$let\ S_m = filter_2(T_m, E)\ in$
　　$eval\_filter\_x(Q[S_1, ..., S_m, R_1, ..., R_k], E)$

FIG. 6

$filter_3(Q[T_1, ..., T_m, R_1, ..., R_k], \Delta) = let\ S_1 = filter_3(T_1, \Delta)\ in$
　　　．
　　　．
　　　．
　　$let\ S_m = filter_3(T_m, \Delta)\ in$
　　$eval\_filter\_d(Q[S_1, ..., S_m, R_1, ..., R_k], \Delta)$ $filter_3(\{\{del(Q, R)\}\}, \Delta) = \{\langle filter_3(Q, \Delta), \emptyset \rangle R\}$
$filter_3(\{\{ins(Q, R)\}\}, \Delta) = \{\langle \emptyset, filter_3(Q, \Delta) \rangle R\}$
$filter_3(\{\{U:A\}\}, \Delta) = filter_3(\{\{U\}\}, \Delta)\ !\ filter_3(\{\{A\}\}, \Delta\ !\ filter_3(\{\{U\}\}, \Delta))$ $filter_3(Q\ when\ \{\{U\}\}, \Delta) = filter_3(Q, \Delta\ !\ filter_3(\{\{U\}\}, \Delta))$

FIG. 7

EFFICIENT HYPOTHETICAL QUERY EVALUATION IN A DATABASE SYSTEM

FIELD OF THE INVENTION

The present invention relates generally to database management techniques, and more particularly to techniques for implementing, evaluating and otherwise processing hypothetical information queries in a database system.

BACKGROUND OF THE INVENTION

Many database systems are configured to support specialized types of hypothetical queries which are useful in application areas such as, for example, version management, decision support, active databases and integrity maintenance. Most existing approaches provide support for hypothetical queries only in specialized forms. Frameworks for expressing hypothetical queries for general-purpose usage have been discussed in S. Ghandeharizadeh, R. Hull and D. Jacobs, "Elevating Deltas to be First-Class Citizens in a Database Programming Language," ACM Trans. on Database Systems, 21(3): 370–426, 1996, and J. Woodfill and M. Stonebraker, "An Implementation of Hypothetical Relations," Proc. of Intl. Conf. on Very Large Databases, pp. 157–165, September 1983, both of which are incorporated by reference herein. For example, a simple hypothetical query as described in the above-cited S. Ghandeharizadeh et al. reference may be of the form Q when $\eta$, where Q is a conventional database query and $\eta$ denotes a hypothetical database state expression that may be a hypothetical update expression $\{U\}$, an explicit substitution of the form $\{Q_1/R_1, \ldots, Q_n/R_n\}$, or any other suitable hypothetical-state expression. Consider a department store database which maintains the following two relations in the form of stored tables: Depts[dept_name, mgr_name], and Products[prod_name, price, color, dept_name]. The relation Depts stores identifiers of departments (dept_name) and their managers (mgr_name), while the relation Products stores the name (prod_name), price, color and selling department (dept_name) of each product. An example of a simple hypothetical query to this database may be expressed informally as follows: [What managers sell at least one product with price$\geq$100] when [Move all green products to Garden department]. More complex hypothetical queries may include multiple when constructs or multiple nested when constructs.

Well-known direct evaluation techniques are often used to process the non-hypothetical conventional query Q. A direct evaluation of Q is an evaluation in which the actual operators mentioned in Q are performed directly. It is known that given a query Q, there may be some other query Q' which is equivalent to Q in that Q' will give the same answer as Q, but where the direct evaluation of Q' is much faster than the direct evaluation of Q. Using this fact, conventional direct evaluation of a query Q may be more efficiently implemented using an optimization step and an evaluation step. The optimization step includes generating a set of queries Q' that are equivalent to Q using "rewriting rules" based on algebraic equivalences, estimating the amount of time it would take to directly evaluate the various queries Q', and selecting a particular query Q' that appears to be fastest to directly evaluate. The evaluation step involves directly evaluating the selected equivalent query Q'. These techniques for evaluation of non-hypothetical queries are generally referred to as "lazy" evaluation techniques.

Although the efficient evaluation of non-hypothetical queries by the above-described lazy evaluation and other techniques is well developed, little work has been done in the area of efficient evaluation of hypothetical queries. More particularly, lazy evaluation techniques have generally not been applied to evaluation of hypothetical queries. Instead, existing techniques for evaluating hypothetical queries are generally "eager" with regard to the evaluation of the hypothetical states. An eager evaluation approach, when given a query of the form Q when $\eta$, generally computes and materializes in the database a representation of the hypothetical database state $\eta$, or a representation of the net change, or delta, called for by $\eta$. The conventional query Q is then evaluated using a standard technique such as the above-described direct evaluation, and the result is "filtered" against the materialized representation of $\eta$. Exemplary eager evaluation techniques are used in the Heraclitus language described in the above-cited S. Ghandeharizadeh et al. reference, and M. Doherty, R. Hull and M. Rupawalla, "Structures for Manipulating Proposed Updates in Object-Oriented Databases," Proc. ACM SIGMOD Symp. on the Management of Data, pp. 306–317, 1996, which is also incorporated by reference herein. Eager evaluation techniques are also used in conventional version management systems, and in implementations of hypothetical relations as described in the above-cited J. Woodfill and M. Stonebraker reference.

A conventional optimizer may be used in conjunction with eager evaluation to optimize a hypothetical query Q when $\eta$ in the manner previously described, that is, to find a Q' equivalent to Q such that direct evaluation of Q' filtered by $\eta$ is faster than direct evaluation of Q filtered by $\eta$. Other techniques have been developed for computing and representing a hypothetical state $\eta$ quickly, and in manner which attempts to ensure that the filtering operation is relatively fast. Existing eager evaluation techniques thus attempt separate optimizations of the conventional query Q and the hypothetical database state $\eta$, but generally assume that the when construct will be evaluated directly through the above-noted filtering mechanism. The existing eager techniques thereby fail to provide sufficiently fast evaluation of hypothetical queries in many important applications.

As noted above, lazy evaluation strategies, although utilized in other database management applications such as in evaluating weakest preconditions, have generally not been applied to evaluation of hypothetical queries. Evaluation of weakest preconditions is described in greater detail in, for example, E. W. Dijkstra, "Guarded Commands, Nondeterminacy and Formal Derivations of Programs," Comm. ACM, 18:453–457, 1975, E. W. Dijkstra, "A Discipline of Programming," Prentice-Hall, 1976, D. Gries, "The Science of Programming," Springer-Verlag, 1981, X. Qian, "An Axiom System of Database Transactions," Information Processing Letters, 36:183–189, 1990 and X. Qian, "The Expressive Power of the Bounded-Iteration Construct," Acta Informatica, 28(7):631–656, October 1991, all of which are incorporated by reference herein. Other lazy evaluation techniques have been developed in logic programming and datalog applications, as described in, for example, D. M. Gabbay and U. Reyle, "N-Prolog: An Extension of Prolog with Hypothetical Implications," Journal of Logic Programming, 1(4):319–355, 1984 and 2(4):251–283, 1985, A. J. Bonner, "Hypothetical Datalog: Complexity and Expressibility," Theoretical Computer Science, 76:3–51, 1990, A. J. Bonner, "The Logical Semantics of Hypothetical Rulebases with Deletion," Journal of Logic Programming, 1995, all of which are incorporated by reference herein. However, these and other lazy or hybrid lazy-eager evaluation techniques, although not requiring materialization of hypothetical states, fail to provide a sufficiently general framework for optimizing hypothetical query evaluation in a variety of applications.

It is therefore apparent that a need exists for improved techniques for evaluating hypothetical database queries, such that the hypothetical queries can be processed more efficiently than is possible using the existing techniques described above.

SUMMARY OF THE INVENTION

In accordance with the principles of the invention, a hypothetical query Q when η in a database system is transformed using explicit substitutions to generate one or more equivalent queries which can be evaluated more efficiently than the original hypothetical query. The equivalent queries may be developed by applying to the original hypothetical query algebraic equivalences involving explicit substitutions where each of the substitutions represents a hypothetical database state change. The use of algebraic equivalences involving explicit substitutions permits when constructs to be moved within hypothetical queries, or removed altogether, while equivalence is preserved. Thus, some of the resulting equivalent queries may be hypothetical, including one or more when constructs, while others may include no when constructs and are not hypothetical. If the when construct is present in the selected equivalent query, then filtering may be used in the direct evaluation process. Advantageously, in contrast to conventional hypothetical query evaluation techniques, the present invention provides an approach in which the when construct generally does not have to be evaluated directly nor eagerly.

The notation η denotes a hypothetical database state expression that may be an hypothetical update expression $\{U\}$, an explicit substitution of the form $\{Q_1/R_1, \ldots, Q_n/R_n\}$, or any other suitable hypothetical-state expression. An exemplary embodiment of the invention applies one or more algebraic equivalences involving explicit substitutions to a given hypothetical query of the form Q when $\{U\}$ where Q is a relational algebra query and U is an update expression. The value assigned to the hypothetical query in a database state DB is the value that Q would return in the state resulting from executing U on DB. The hypothetical query may include multiple nested occurrences of the when construct, and the update U may involve a sequence of several atomic updates which may include multiple nested occurrences of the when construct. Each of the explicit substitutions represents a hypothetical database state change, and is applied to hypothetical query Q when $\{U\}$ in order to generate at least one additional query which is equivalent to the hypothetical query. Several equivalent queries may be generated, and their estimated computation times compared, such that a particular equivalent query can be selected for direct evaluation. The use of explicit substitutions to represent hypothetical database states allows when constructs or other hypothetical programming constructs to be effectively eliminated from the equivalent query. The evaluation process may be facilitated by configuring the original hypothetical query in a normal form, such that each hypothetical state expression of the query is specified by an explicit substitution. The selected equivalent query can then be evaluated using a purely lazy evaluation strategy, or a hybrid lazy-eager evaluation strategy, as appropriate for a given application. The present invention thus provides substantially greater flexibility than conventional hypothetical query evaluation techniques which apply only eager evaluation strategies.

These and other features and advantages of the present invention will become more apparent from the accompanying drawings and the following detailed description.

BRIEF DESCRIPTION OF THE DRAWINGS

FIGS. 2A through 2G show a family of equivalences in an exemplary set of hypothetical query language (HQL) expressions in accordance with the invention;

FIGS. 3A and 3B show exemplary HQL functions free(Q) and dom(Q), respectively, in accordance with an illustrative embodiment of the invention;

FIGS. 5, 6 and 7 show exemplary HQL functions $filter_1$, $filter_2$ and $filter_3$, respectively, used in exemplary query evaluation algorithms in accordance with the invention.

DETAILED DESCRIPTION OF THE INVENTION

The present invention will be illustrated below in conjunction with exemplary hypothetical database queries in the context of a relational database model. It should be understood, however, that the invention is not limited to use with any particular type of database, database configuration or database model, but is instead more generally applicable to any database application in which it is desirable to provide efficient processing of hypothetical queries. For example, the techniques of the invention could be readily adapted for use with an object-oriented database model. The term "data item" as used herein refers to a stored data element, such as an entry in a record, table or other relation. The term "database system" should be understood to include any type of system in which data items are stored or processed in one or more sites. The term "when construct" as used herein should be understood to include not only the illustrative when construct described herein, but also other types of programming language constructs which are used to support hypothetical query capability, such as, for example, similar constructs used in "what if" queries. The term "hypothetical database state change" as used herein refers to an expression that specifies a possible change or modification to a database state, to a part of a database state, or to the values of one or more objects in a database state. This expression might arise in the context of a hypothetical query, or in the context of decision support involving hypothetical states of a database or values of objects in the database, or in the context of the creation of a version of a full or partial database state or collection of objects in a database state, or in the context of accessing a previously occurring state of the database or values of a collection of objects in the database state, or in the execution of rules or analogous processing as in an active database system. An "eager" strategy for evaluating a hypothetical query refers to a strategy in which all hypothetical state representations are either partially or completely materialized, and query evaluation is filtered through those representations. A "lazy" strategy for evaluating a hypothetical query refers generally to a strategy in which the hypothetical query is first reformulated into an equivalent non-hypothetical query, and then the equivalent query is evaluated in place of the original hypothetical query. A "hybrid lazy-eager" strategy is one in which the hypothetical query is reformulated into a different but equivalent hypothetical query involving at least one when construct, and then the equivalent hypothetical query is evaluated using the eager strategy.

Figure 1A:
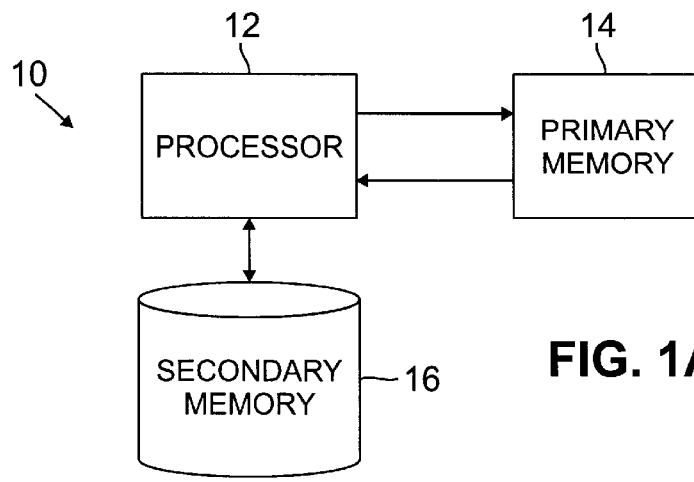
FIGS. 1A and 1B show exemplary database systems in which the hypothetical query evaluation techniques of the present invention may be implemented.

FIG. 1A shows an exemplary database system 10 in which the hypothetical query evaluation of the present invention may be implemented. The system 10 includes a processor 12 connected to communicate with a primary memory 14 and a secondary memory 16. The processor 12 can be implemented as a personal, micro or mainframe computer, a workstation, a microprocessor, a central processing unit, an application-specific integrated circuit (ASIC) or other digital data processor, as well as various portions or combinations thereof. The primary memory 14 is typically an electronic memory associated with the processor 12. The secondary memory 16 may be an external magnetic or optical disk memory, a magnetic tape memory, or other suitable data storage device. The primary and secondary memory of the system 10 may represent storage locations of data warehouses, data marts or other large databases having storage capacities of up to a few terabytes, smaller localized database memories, or even memories associated with desktop or portable computers. As will be described in detail below, the hypothetical query evaluation techniques of the present invention may be implemented as a software program stored in portions of one or both of the memories 14 and 16, and executed by processor 12. The software program may be configured to implement, evaluate and otherwise process hypothetical queries to a database or databases associated with one or both of the memories 14 and 16. The system 10 may also utilize processor 12 and memories 14, 16 to provide conventional query processing capabilities such as those described in, for example, H. F. Korth and A. Silberschatz, "Database System Concepts," Second Edition, McGraw-Hill, New York, 1991, and R. Elmasri and S. B. Navathe, "Fundamentals of Database Systems," Ch. 18, Benjamin/Cummings, Redwood City, Calif., 1989, both of which are incorporated by reference herein.

Figure 1B:
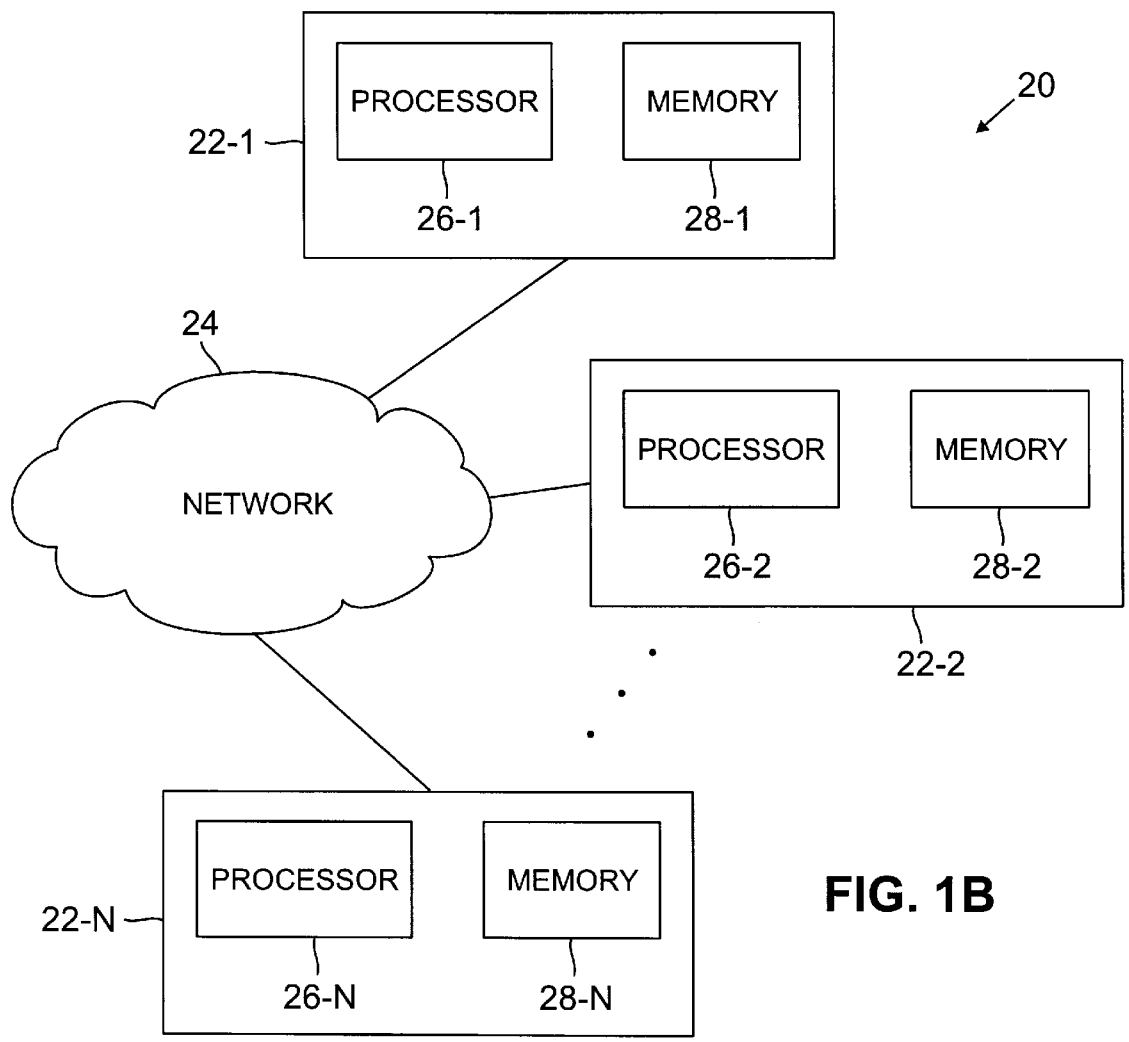

FIG. 1B shows an exemplary distributed database system 20 in which the hypothetical query evaluation of the present invention may be implemented. The system 20 includes N physical sites 22-$i$, i=1, 2, . . . N connected by a network 24. The network 24 may be a local area network, a metropolitan area network, a wide area network, a global data communications network such as the Internet, a private "intranet" network or any other suitable data communication medium. The sites 22-$i$ may be centralized database systems such as data warehouses or data marts, remote customer sites such as automatic teller machines or desktop personal computers, portable computers or other mobile computing devices, or any other type of data processors. Each of the N sites 22-$i$ includes a processor 26-$i$ and a memory 28-$i$. The memory 28-$i$ may be, for example, a large centralized database system, or a memory of a desktop or portable personal, depending upon the nature of the corresponding physical site 22-$i$. The processors 26-$i$ may each run a conventional local database management system. Like the processor 12 of FIG. 1A, the processors 26-$i$ can be implemented as personal, micro or mainframe computers, workstations, microprocessors, central processing units, ASICs or other digital data processors, as well as various portions or combinations thereof. The memories 28-$i$ may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a memory 28-$i$ of a given site 22-$i$ is controlled by the corresponding processor 26-$i$ using the local database management system. The sites 22-$i$ of system 20 may each run multiple transactions, such as read and write transactions, during which data items stored at other sites are accessed and processed. One or more of the sites 22-$i$ of FIG. 1B may execute a software program which implements, evaluates and otherwise processes hypothetical queries to a database or databases associated with one or more of the memories 28-$i$.

Hypothetical query evaluation in accordance with the invention provides additional optimization beyond that provided by conventional techniques. More particularly, the invention provides a framework that, given an exemplary hypothetical query Q when $\eta$, can be used to find many queries that are equivalent to Q when $\eta$. The notation $\eta$ represents a hypothetical database state expression, such as an update expression $\{U\}$, an explicit substitution of the form $\{Q_1/R_1, \ldots, Q_n/R_n\}$ which specifies that relation $R_i$ is to be replaced by the query $Q_i$, an expression constructed by an operation that composes substitutions, or other suitable hypothetical state expression. Some of the resulting equivalent queries may also be hypothetical, including one or more when constructs, while others may include no when constructs. The framework to be described below includes mechanisms for moving when constructs within hypothetical queries, while preserving equivalence. In contrast to conventional hypothetical query techniques, the evaluation framework of the present invention provides an approach in which the when construct generally does not have to be evaluated directly.

The present invention is based in part on the discovery that hypothetical database state expressions can be specified using explicit substitutions. As noted above, a hypothetical database state expression $\eta$ may be $\{U\}$ where U is an update expression. An exemplary hypothetical state expression $\eta$ corresponding to the update '[Move all green products to Garden dept]' might be:

$$\eta = \{ins(\text{Products},$$

$$\pi_{prod\_name, price, color}(\sigma_{color='green'}\text{Products}) \times \{\langle\text{'Garden'}\rangle\});$$

$$del(\text{Products}, \sigma_{color='green' \wedge dept\_name \neq 'Garden'}\text{Products})\}$$

In the above hypothetical state, a certain set of tuples has been inserted into Products and another set of tuples has been deleted from Products. The specific inserted set is essentially the same set of tuples of green products that are already in Products, but using the value Garden in the dept_name column. The deleted set is the set of tuples of green products that do not have Garden in their dept_name column. An explicit substitution $\epsilon$ that is equivalent to the hypothetical state $\eta$ given above is:

$$\varepsilon = \{(\text{Products} - \sigma_{color='green' \wedge dept\_name \neq 'Garden'}(\text{Products}) \cup$$

$$\pi_{prod\_name, price, color}(\sigma_{color='green'}(\text{Products})) \times$$

$$\{\langle\text{'Garden'}\rangle\})/\text{Products}\}$$

If X is defined as the query:

$$(\text{Products} - \sigma_{color='green' \wedge dept\_name \neq 'Garden'}(\text{Products}) \cup$$

$$\pi_{prod\_name, price, color}(\sigma_{color='green'}(\text{Products})) \times \{\langle\text{'Garden'}\rangle\}),$$

the hypothetical state expression $\eta$ may be written as $\{X/\text{Products}\}$. The hypothetical state expression $\eta$ thus represents a hypothetical state in which the relation Products is replaced by the value that query X has in the current database state. The explicit substitution $\epsilon$ indicates that the value of one relation is to be changed. In general, an explicit substitution in accordance with the invention may indicate that the values of several relations are to be changed.

The present invention provides an algorithm for transforming hypothetical state expressions, such as {U} where U is an update expression, into equivalent explicit substitutions. The update expression U may be expressed in a language that mimics the update expressions of SQL, the standard query language for the well-known relational model. Assume that Q when {U} is a hypothetical query, where Q is essentially a relational algebra query which may include nested when constructs. The value assigned to this hypothetical query in a given database state DB is the value that Q would return in the state that is reached from DB by executing the update U. Such queries are fundamental to many applications that involve hypothetical database states. The present invention recognizes that if $\epsilon$ is an explicit substitution equivalent to {U}, then a new query Q when $\epsilon$ is equivalent to the original hypothetical query Q when {U}. The new query can be further processed using the techniques of the present invention to generate equivalent queries in which the when construct is possibly eliminated, or is "moved" to other parts of the query. The illustration of elimination of an explicit substitution will be described in conjunction with the exemplary hypothetical query:

[What managers sell at least one product with price ≥ 100] when

[Move all green products to the Garden dept].

This hypothetical query may be written formally as:

$Q$ when $\{U\}$ =

$\pi_{mgr\_name}((\sigma_{price \geq 100}(\text{Depts} \bowtie \text{Products}))$ when $\{ins(\text{Products},$ $\pi_{prod\_name, price, color}(\sigma_{color='green'}\text{Products}) \times \{\langle'\text{Garden}'\rangle\});$ $del(\text{Products}, \sigma_{color='green' \land dept\_name \neq 'Garden'}\text{Products})\},$ where $\bowtie$ is the join operator. The hypothetical state expression can then be transformed into an explicit substitution, in the manner previously described, to yield:

$= \pi_{mgr\_name}(\sigma_{price \geq 100}(\text{Depts} \bowtie \text{Products}))$ when $\{X / \text{Products}\}$ It is now possible to "push the explicit substitution" into query Q through the join operation. In this simple example, the "pushing" is achieved by replacing the relation name Products by the query X, thus obtaining:

$= \pi_{mgr\_name}(\sigma_{price \geq 100}(\text{Depts} \bowtie X)).$

The above query is equivalent to the hypothetical query Q when {U}. It includes no when constructs, and is a conventional non-hypothetical query. Furthermore, it should be noted that a conventional "pushing selection through join" transformation can be applied to the join inside the query X. More generally, rules for rewriting queries involving when in accordance with the invention can be used in conjunction with known rules for rewriting conventional queries.

The preceding example is illustrative of a process of efficient evaluation of hypothetical queries in accordance with the present invention. Like the prior art direct evaluation techniques described above, an evaluation process in accordance with the present invention may include an optimization step and an evaluation step. The process begins with a hypothetical query, that may have one or more when constructs, properly nested. The optimization step in the inventive process involves generating a set of queries that are equivalent to the hypothetical query. The set of queries are generated by manipulating subexpressions of the original hypothetical query using a set of equivalences, to be described in conjunction with FIGS. 2A–2G below, either to move the when constructs to other parts of a query, or to remove the when constructs altogether, or to replace hypothetical state change expressions by explicit substitutions, or to transform, combine or eliminate one or more explicit substitutions. The equivalences of the present invention may be used in conjunction with well-known equivalences which have been used for conventional non-hypothetical queries. The resulting equivalent queries may be in an Evaluable Normal Form (ENF), to be described in greater detail below, such that no query utilizes a composition operator and each hypothetical state expression is an explicit substitution. The optimization step also involves estimating the amount of time it would take to evaluate directly each of the queries in the set of equivalent queries, and selecting a particular equivalent query that appears to be the fastest to evaluate directly. The evaluation step involves directly evaluating the selected equivalent query in a manner to be described in greater detail below. The present invention provides improved performance through the use of explicit substitutions to represent hypothetical database states, based on a number of equivalences that exploit the explicit substitutions for the purpose of query optimization.

As noted above, an important aspect of the present invention is the ability to represent hypothetical database states and hypothetical state change expressions as explicit substitutions. An illustrative language of hypothetical queries will be described below. It will be shown that, in accordance with the invention, substitutions can be treated as updates, updates can be treated as substitutions, and substantially all instances of the when construct can be eliminated or otherwise removed from direct evaluation by application of explicit substitutions. Explicit substitutions are described in greater detail in M. Abadi, L. Cardelli, P. Curien and J. Levy, "Explicit Substitutions," Journal of Functional Programming, 1(4):375–416, 1991, G. Dowek, T. Hardin and C. Kirchner, "Higher-Order Unification via Explicit Substitutions," IEEE Symposium on Logic in Computer Science, pp. 366–374, 1995, and P. Lescanne, "From $\lambda\sigma$ to $\lambda\nu$—A Journey Through Calculi of Explicit Substitutions," ACM SIGPLAN-SIGACT Symposium on Principles of Programming Languages (POPL), pp. 60–69, 1994, all of which are incorporated by reference herein. In these references, explicit substitutions are described in conjunction with programming and the lambda base calculus. It is believed that explicit substitutions, although generally well-known per se, have not heretofore been applied to optimizing the evaluation of hypothetical queries.

For purposes of illustrating the invention in detail, a specific formalism will now be introduced. This formalism includes an illustrative language called "HQL" for hypothetical queries. HQL includes a specific conventional query language, a specific update language, and a specific language for hypothetical queries. A relational database schema is defined herein as a collection of relation names $Z=\{Z_1, \ldots, Z_Z\}$, each of which includes one or more attributes. An instance of a relation name contains zero or more records or tuples, where each tuple includes one or more stored data items or entries for each attribute. In addition, the relation names each have a fixed "arity," where arity refers generally to the number of attributes associated with a given relation. For example, in a database in which each relation includes a number of table entries, the arity of the relation name may be the number of column headings in the table. It will be assumed without limitation that a particular database schema Z is fixed. The variables R, $R_j$, S and $S_j$ will be used to range over the relation names of Z. The language to be defined will include queries Q, updates U and hypothetical queries H. Initially, a subset of the language HQL will be defined in order to introduce various aspects of the invention. The full language HQL will then be presented at a point noted below. Hypothetical queries $H \in \mathbf{H}$ are defined by the grammar:

$$H ::= Q \text{ when } \{U\}$$

In any given database state, this construct represents the value that Q would have in the state reached by executing update U. Relational algebra queries $Q \in \mathbf{RA}$ are generated by the grammar:

| Q ::= | R | base relation |
|---|---|---|
| \| | $\{t\}$ | singleton set |
| \| | $\sigma_p(Q)$ | selection |
| \| | $\pi_A(Q)$ | projection |
| \| | $Q \cup Q$ | union |
| \| | $Q \cap Q$ | intersection |
| \| | $Q \times Q$ | cartesian product |
| \| | $Q \bowtie_p Q$ | join |
| \| | $Q - Q$ | difference |

For clarity of illustration, details such as condition expressions in selection and join, and column expressions in projections, will not be shown. The usual typing rules will be assumed with regard to arities of query expressions. Updates $U \in \mathbf{U}$ are generated by the grammar:

| U ::= | ins (R, Q) | insert the value of Q into R |
|---|---|---|
| \| | del (R, Q) | delete the value of Q from R |
| \| | (U; U) | sequence |

The set of all relations of arbitrary arity is denoted by R. A database state is a function DB mapping every relation name $S \in Z$ to a relation $DB(S) \in \mathbf{R}$ of the appropriate arity. The set of all database states is denoted by DB. Each syntactic category has an associated semantic function, $[Q]: DB \to R$, $[U]: DB \to DB$, $[H]: DB \to R$.

The semantic function $[Q]$ is defined in a conventional manner. The function $[U]$ is defined recursively as:

$[ins(R, Q)](DB) = DB[R \leftarrow [R \cup Q](DB)]$ $[del(R, Q)](DB) = DB[R \leftarrow [R - Q](DB)]$ -continued $[(U_1; U_2)](DB) = [U_2]([U_1](DB))$ The notation $DB[R \leftarrow]$ denotes the database state DB' such that DB'(R)=V and DB'(S)=DB(S) when $R \neq S$. In practice, if a database is currently in state DB and update expression U is executed, then the database will move to state $[U]$ (DB). The semantics of hypothetical queries are defined as follows:

$[Q \text{ when } \{U\}](DB) = [Q]([U](DB))$.

As noted previously, the query Q when $\{U\}$ can be simplified using substitutions. A partial function $\mu: Z \leftarrow RA$ is called a substitution if for every $S \in dom(\mu)$ the arity of S is equal to the arity of $\mu(S)$. The set of all substitutions over RA is denoted by $\Sigma(RA)$. The notation $\mu = \{Q_1/S_1, \ldots, Q_j/S_j\}$ is used to denote the substitution $\mu$ where $dom(\mu) = \{S_1, \ldots S_j\}$ and $\mu(S_i) = Q_i$. Given a substitution $\mu$ and a query Q, the function $sub(Q, \mu)$ denotes the query that results from replacing every occurrence of a name S in Q with the query $\mu(S)$, for each $S \in dom(\mu)$. For any substitution $\mu$, the query $sub(Q, \mu)$ is called a substitution instance of Q. For example, if $\mu = \{(S-R)/R, \sigma_q(R)/S\}$ and $Q = (\pi_A(R \times S)) \cup V$, then $sub(Q, \mu) = (\pi_A((S-R) \times \sigma_q(R))) \cup V$ Given substitutions $\mu_1$ and $\mu_2$, the composition of $\mu_1$ and $\mu_2$, denoted $\mu_1 \# \mu_2$, is the unique substitution $\mu_3$ such that $dom(\mu_3) = dom(\mu_1) \cup dom(\mu_2)$, and for any $S \in dom(\mu_3)$, $$\mu_3(S) = \begin{cases} sub(\mu_2(S), \mu_1) & S \in dom(\mu_2) \\ \mu_1(S) & \text{otherwise.} \end{cases}$$

The condition that $dom(\mu_3) = dom(\mu_1) \cup dom(\mu_2)$ ensures that $\mu_1 \# \mu_2$ is unique as a substitution. Without this condition, the substitution could be "padded out" with bindings of the form S/S. It can be shown that for each substitution $\mu_1$, $\mu_2$ and $\mu_3$ and each query Q, $sub(Q, \mu_1 \# \mu_2) = sub(sub(Q, \mu_2), \mu_1)$, and $\mu_1 \# (\mu_2 \# \mu_3) = (\mu_1 \# \mu_2) \# \mu_3$.

For example, if $\mu_1 = \{(S-R)/R, \sigma_q(R)/S\}$ and $\mu_2 = (\pi_B(R \bowtie T))/S, \sigma_p(S)/V$, then $\mu_1 \# \mu_2 = \{(S-R)/R, (\pi_B((S-R) \bowtie T))/S, \sigma_p(\sigma_q(R))/V\}$.

The substitution $\mu = \{Q_1/S_1, \ldots, Q_j/S_j\}$ can also be viewed as an "algebraic" representation of the update that simultaneously replaces table $S_i$ with the value of query $Q_i$. In other words, the update represented by $\mu$ executes the j operations $S_i := Q_i$ in parallel. To arrive at the value of $sub(Q, \mu)$ in state DB, one can therefore either evaluate $sub(Q, \mu)$ in DB or can execute the abstract update represented by $\mu$ and then evaluate Q in the resulting state. A function $apply(DB, \mu)$ can be defined as the database state DB' such that:

$$DB'(R) = \begin{cases} [\mu(R)](DB) & R \in dom(\mu) \\ DB(S) & \text{otherwise.} \end{cases}$$

For every database state DB, $[sub(Q, \mu)](DB) = [Q](apply(DB, \mu))$.

When substitutions are viewed as updates, then composition corresponds to sequential execution. For example, if $\mu_1$ and $\mu_2$ are substitutions, then for every database state DB, $$\text{apply}(DB, \mu_1 \# \mu_2) = \text{apply}(\text{apply}(DB, \mu_1), \mu_2).$$

It should be noted that when substitutions are viewed as updates, the composition operator corresponds to composing update functions in the opposite order relative to that in which the corresponding substitution functions are applied.

Updates may also be transformed into substitutions in accordance with the invention. Given an update U, a substitution slice(U) is defined that has the same effect as U when it is treated as an "abstract" update. The substitution slice(U) is constructed using an operation which is related to program slicing as described in S. Horwitz and T. Reps, "The Use of Program Dependence Graphs in Software Engineering," Proceedings of the 14th International Conference on Software Engineering, 1992, which is incorporated by reference herein. If $R \in \text{dom}(\text{slice}(U))$, the query $Q = (\text{slice}(U))(R)$ may be thought of as the "slice" of U that is relevant to R. In other words, as far as R is concerned, the update U has the same effect as executing R := Q. The substitution slice(U) is defined recursively as:

$$\text{slice}(\text{ins}(R, Q)) = \{(R \cup Q)/R\}$$

$$\text{slice}(\text{del}(R, Q)) = \{(R-Z)/R\}$$

$$\text{slice}((U_1; U_2)) = \text{slice}(U_1) \# \text{slice}(U_2).$$

For example, if $U = (\text{ins}(R, Q_1); \text{del}(S, \sigma_p(R)))$, then:

$$\begin{aligned}\text{slice}(U) &= \text{slice}(\text{ins}(R, Q_1)) \# \text{slice}(\text{del}(S, \sigma_p(R))) \\ &= \{(R \cup Q_1)/R\} \# \{(S - \sigma_p(R))/S\} \\ &= \{(R \cup Q_1)/R, (S - \sigma_p(R \cup Q_1))/S\}.\end{aligned}$$

From the foregoing, it can be seen that for each update U and each database state DB, $\text{apply}(DB, \text{slice}(U)) = [\![U]\!](DB)$. A hypothetical query Q when {U} can therefore be evaluated in the current state since it is equivalent to a substitution instance of Q. For each database state the RA query sub(Q, slice(U)) has the same value as the hypothetical query Q when {U}. That is, for each state DB, $$[\![Q \text{ when } \{U\}]\!](DB) = [\![\text{sub}(Q, \text{slice}(U))]\!](DB).$$

For example, if $U = (\text{ins}(R, Q_1); \text{del}(S, \sigma_p p(R)))$ as in the previous example, and $Q = \pi_A(S) \bowtie V$, then evaluating Q when {U} will be equivalent to evaluating:

$$\text{sub}(Q, \mu) = \pi_A(S - \sigma_p(R \cup Q_1))) \bowtie V.$$

Unlike the original hypothetical query Q when {U}, the above equivalent query can be evaluated using standard techniques.

The foregoing description demonstrated: (1) how substitutions can be treated as updates, (2) how updates can be expressed as substitutions, and (3) how hypothetical queries can be expressed as substitution instances. A number of syntactic constructs will now be introduced to define the full illustrative language HQL to represent substitutions and the application of suspended substitutions. The HQL will include a grammar for hypothetical state expressions η and for explicit substitutions ε. The conventional grammar of RA queries is extended to RA[hyp] queries as follows:

$$Q ::= \ldots$$
$$| \quad Q \text{ when } \eta \quad \text{hypothetical query}$$

That is, hypothetical queries can occur at any nesting level within a query. Hypothetical-state expressions $\eta \in \text{HS}$ are defined by the rule:

$$\eta ::= \varepsilon \quad \text{explicit substitution}$$
$$| \quad \{U\} \quad \text{hypothetical state reached by } U$$
$$| \quad \eta \# \eta \quad \text{composition}$$

while explicit substitutions $\varepsilon \in E$ are defined by the grammar:

$$\varepsilon ::= \{Q_1/S_1, \ldots, Q_j/S_j 56 \, j \geq 0\}$$

where the $Q_i$ are RA[hyp] queries and the $S_i$ are distinct names from Z. The direct semantics of the illustrative HQL are defined by the functions:

$$[\![Q]\!]: DB \to R,$$
$$[\![\eta]\!]: DB \to DB,$$
$$[\![\varepsilon]\!]: DB \to DB.$$

The function $[\![Q]\!]$ is obtained by extending the semantic function defined previously and is given by:

$$[\![Q \text{ when } \eta]\!](DB) = [\![Q]\!]([\![\eta]\!](DB)).$$

The function $[\![\eta]\!]$ (DB) is defined as:

$$[\![\{\ldots, Q_j/S_j, \ldots\}]\!](DB) = DB[\ldots, S_j \leftarrow [\![Q_j]\!](DB), \ldots]$$
$$[\![\{U\}]\!](DB) = [\![U]\!](DB)$$
$$[\![(\eta_1 \# \eta_2)]\!](DB) = [\![\eta_2]\!]([\![\eta_1]\!](DB))$$

This reflects the direct computational interpretation of a hypothetical-state expression. It will now be shown that any η can be transformed into an equivalent abstract substitution that uses queries from RA, and that any hypothetical query in RA[hyp] can be transformed into an equivalent query in RA, that is, into an equivalent query having no when constructs.

A reduce function red(η) is defined that maps any partial state expression η to an abstract substitution red(η) $\in \Sigma(\text{RA})$. In addition, a function red(Q) is defined that transforms any $Q \in \text{RA}^{hyp}$ into a query red(Q) $\in$ RA. These functions are defined in a mutually recursive manner as follows:

$$\text{red}(\ldots, Q_j/S_j, \ldots) = \{\ldots, \text{red}(Q_j)S_j, \ldots\}$$
$$\text{red}(\{U\}) = \text{slice}(U)$$
$$\text{red}(\eta_1 \# \eta_2) = \text{red}(\eta_1) \# \text{red}(\eta_2)$$
$$\text{red}(R) = R$$
$$\text{red}(\{t\}) = \{t\}$$
$$\text{red}(u\_op(Q)) = u\_op(\text{red}(Q))$$
$$\text{red}(Q_1 \, b\_op \, Q_2) = (\text{red}(Q_1)) \, b\_op \, (\text{red}(Q_2))$$

red($Q$ when $\eta$)=sub(red($Q$), red($\eta$))

where u_op denotes any unary algebraic operator, and b_op denotes any binary algebraic operator. This transformation makes explicit the relationship between meta-level and object-level constructs. It illustrates that hypothetical state expressions can be viewed as substitutions and that in a hypothetical expression '$Q$ when $\eta$' the expression 'when $\eta$' can be viewed as a suspended substitution. This is justified by the fact that, in general, if $Q \in RA^{hyp}$, then red($Q$) $\in$ RA, and for each database state DB, each query $Q \in RA^{hyp}$, and each hypothetical-state expression $\eta$, $$[\![Q]\!](DB) = [\![red(Q)]\!](DB),$$

and $$[\![\eta]\!](DB) = apply(DB, red(\eta)).$$

The reduction semantics presented above provide one type of strategy for evaluating HQL queries. That is, a query $Q \in RA^{hyp}$ can be reduced to the query red($Q$) $\in$ RA. This allows hypothetical queries to be optimized using standard techniques developed for RA. The above-described HQL can thus be implemented on top of standard relational database systems. A more general framework will now be developed for optimizing and evaluating hypothetical queries, that incorporates both eager and lazy evaluation of hypothetical state expressions. A central component of this framework is an equational theory for HQL which is a combination of (1) a conventional equational theory for the relational algebra, (2) an equational theory of explicit substitutions, and (3) a set of equations that relate hypothetical update expressions of the form {U} to explicit substitutions. The equational theory will be described in conjunction with FIGS. 2A through 2G. Another aspect of the optimization strategy is referred to herein as Evaluable Normal Form (ENF), and will be described in greater detail below. In general, an arbitrary HQL query Q can be converted into one or more equivalent ENF queries Q' using a set of rewriting rules based on the equational theory. The syntax tree of an ENF query Q' can be used to guide a systematic execution of the operators in Q'. Each explicit substitution present in Q' will be materialized during this execution, and subqueries within the scope of the explicit substitution will be "filtered" against that materialization. Thus, for a given HQL query Q, the choice of an equivalent ENF query Q' is in effect the choice of how eager or lazy the evaluation of Q will be. The concept of "explicit substitution value" or "xsub-value," a physical value that can be associated with an explicit substitution, will be described below, along with exemplary operators involving xsub-values. Two illustrative algorithms for evaluating ENF queries will also be described, both based on the use of xsub-values. The first performs a systematic depth-first traversal of an ENF syntax tree, while the second permits some clustered evaluation of individual algebraic operations, such as combining a join operation with select and project operations immediately above or below it. A generalization of one of the query evaluation algorithms to delta values will also be described. The generalization is useful for situations in which the hypothetical updates in an HQL query Q change only a small portion of the data, such that it is not efficient to compute the full value of the associated explicit substitutions.

FIGS. 2A through 2G illustrate an exemplary family of equivalences that can be used for rewriting HQL queries in accordance with the invention. Some of the equivalences are based on properties of explicit substitutions, while others are based on interaction of the when construct with relational algebra operators. Additional details regarding explicit substitutions suitable for use with the present invention may be found in the above-cited M. Abadi et al., G. Dowek et al. and P. Lescanne references. The family of equivalences involving constructs from HQL is referred to as $EQUIV_{when}$, and includes "push-when-into-algebra-expressions" in FIG. 2A, "convert-to-explicit-substitutions" in FIG. 2B, "replace-nested-when" in FIG. 2C, "compute-composition" in FIG. 2D, "substitution-simplification" in FIG. 2E, "associativity" in FIG. 2F, and "commute-hypotheticals" in FIG. 2G. In FIGS. 2A through 2G, u_op and b_op denote arbitrary unary and binary relational algebra operators, respectively. A number of definitions are needed for the "substitution-simplification" and "commute-hypotheticals" rules of FIGS. 2E and 2G, respectively. If $\epsilon$ is an explicit substitution and R a relation name, then $\epsilon|_{-R}$ denotes the explicit substitution obtained from $\epsilon$ by deleting the binding with a right-side 'R'. FIGS. 3A and 3B show the mutually recursive definition of HQL functions free and dom, respectively. The function free(E) is the set of relation names occurring "free" in E. For hypothetical-state and update expressions E, dom(E) is the set of relation names that are "defined" by E. In essence, these functions articulate scoping rules for the when construct. It can be verified that the equations of $EQUIV_{when}$ exhibit the property of soundness. Soundness generally continues to hold if equations for the relational algebra are incorporated into the system.

The above-noted evaluable normal form (ENF) for HQL queries will now be described in more detail, along with a family of syntax trees that are used to represent queries in this form. An HQL query is in ENF if it does not use composition (#) or expressions of the form {U}. This means that all hypothetical-state expressions are in the form of explicit substitutions. Note that for an explicit substitution of form { ..., Q/R, ... }, the when construct may occur within Q. Specialized syntax trees may be used to represent ENF queries. Each node v of the syntax tree for an ENF query has a label, denoted as label(v), that is either a relational operator, or a relation name, or 'when', or '{ }'. These trees differ from conventional relational algebra trees in that: (1) the when construct may be present, as an infix binary operator, and (2) an explicit substitution $\{Q_1/R_1, \ldots, Q_n/R_n\}$ is represented as follows: the parent node is labeled by { }, and has n children. For each i there is a child corresponding to query $Q_i$, and the edge to that child has label $R_i$.

Figure 4:
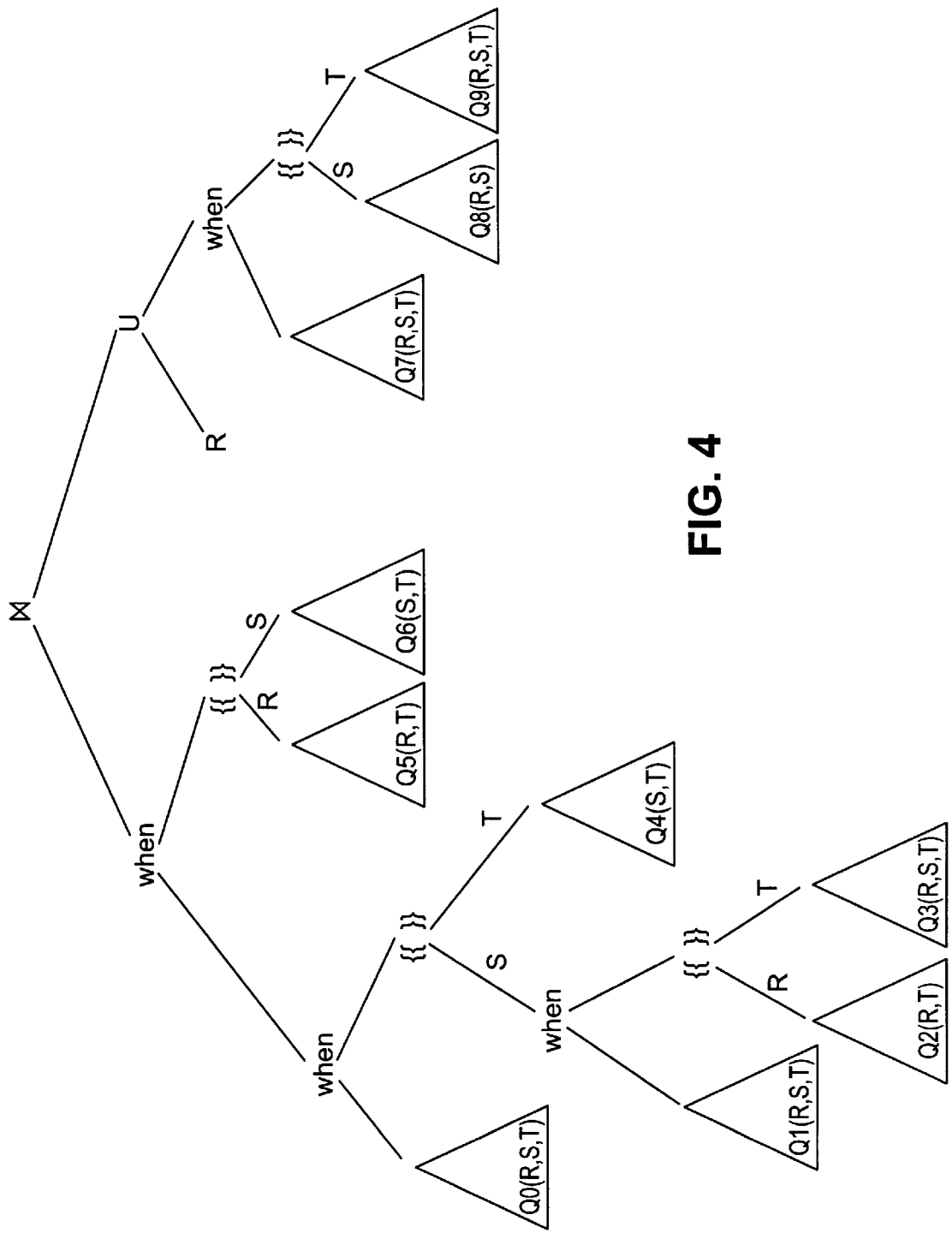
FIG. 4 shows a syntax tree formed in accordance with the invention for a query in evaluable normal form (ENF)

FIG. 4 shows an example of a syntax tree, formed in accordance with the above description, for the query: (($Q_0$ (R, S, T) when $\{Q_1(R, S, T)\}$ when $\{Q_2(R, T)/R, Q_3(R, S, T)/T\})/S, Q_4(S, T)/T\})$ when $\{Q_5(R, T)/R, Q_6(S, T)/S\})$ ⋈ (R $\cup$ ($Q_7(S, R, T)$ when $\{Q_8(R, S)/S, Q_9(R, S, T)/T\})$). The subqueries $Q_0, \ldots, Q_9$ in this example are assumed to be from relational algebra. It should be noted that the above-described ENF is exemplary only. Numerous variants of this exemplary ENF may be used in accordance with the present invention. One possible variant, referred to as mod-ENF, will be described in detail below.

Evaluation of an ENF query generally involves the construction of relations, and of physical values corresponding to explicit substitutions. The concept of "explicit substitution value" will now be described, along with algebraic operators that use the explicit substitution value. More particularly, an illustrative equation is presented that describes how explicit substitution values should be combined when evaluating ENF queries with nested when constructs. In general, an ENF query is typically evaluated in the context of a fixed database state DB. As noted above, the semantics of an explicit substitution $\epsilon$ is a function from DB to DB. Thus, the value of $\epsilon$(DB) is a full database state. In practice, if a relation name $R \in Z$ is not in dom($\epsilon$) there is generally no point in replicating the value of DB(R) when constructing the value of $\epsilon$(DB). An "explicit substitution value," abbreviated herein as "xsub-value," is a partial function E that maps relation names in Z into relations, where relation E(R) has the same arity as relation name R for each $R \in$ dom(E). An xsub-value E may be denoted as a set $E=\{J_1/R_1, \ldots J_n/R_n\}$ of binding pairs, where each $J_i$ is a physical relation. The family of xsub-values is denoted by ESV.

A basic operator involving xsub-values is an apply operator that maps database states and xsub-values to database states. This apply operator is defined as:

$$\text{apply}(DB, E)(R) = \begin{cases} E(R) & \text{if } R \in dom(E) \\ DB(R) & \text{otherwise.} \end{cases}$$

There is a natural mapping $[\cdot]_{x\_val}$ such that for each explicit substitution $\epsilon$, $[\epsilon]_{x\_val}$: DB$\rightarrow$ESV. This mapping is defined by:

$$[\{Q_1/R_1, \ldots, Q_n/R_n\}]_{x\_val}(DB) = \{[Q_1](DB)/R_1, \ldots, [Q_n](DB)/R_n\}.$$

It is therefore apparent that for each query Q, explicit substitution $\epsilon$ and state DB, $$\text{apply}(DB, [\epsilon]_{x\_val}(DB)) = [\epsilon](DB).$$

An exemplary smash operator for combining xsub-values will now be described. This smash operator, which is denoted '!', is closely related to the above-described compose operator for explicit substitutions, and is also related to a smash operator used for delta values in the above-noted Heraclitus language. The smash of xsub-values $E_1$ and $E_2$ has domain dom($E_1$) $\cup$ dom($E_2$), and is defined by:

$$(E_1 ! E_2)(R) = \begin{cases} E_2(R) & \text{if } R \in dom(E_2) \\ E_1(R) & \text{if } R \in dom(E_1) - dom(E_2). \end{cases}$$

It can be verified for explicit substitutions $\epsilon_1$ and $\epsilon_2$ and state DB that:

$$[\epsilon_1 \# \epsilon_2]_{x\_val}(DB) =$$
$$[\epsilon_1]_{x\_val}(DB)![\epsilon_2]_{x\_val}(\text{apply}(DB, [\epsilon_1]_{x\_val}(DB))).$$

The following equation describes how the smash operator can be used to combine nested xsub-values during the evaluation of ENF queries. For each query Q, $$[(Q \text{ when } \epsilon_2) \text{ when } \epsilon_1](DB) = [Q \text{ when } (\epsilon_1 \# \epsilon_2)](DB) = [Q](\text{apply}(DB,$$
$$[\epsilon_1]_{x\_val}(DB)![\epsilon_2]_{x\_val}\text{apply}(DB, ([\epsilon_1])_{x\_val}(DB)))).$$

Evaluation of ENF queries using xsub-values in accordance with the invention will now be described using two exemplary evaluation algorithms. The first illustrates a basic approach to "filtering" the evaluation of a query by an xsub-value. The second provides improvements over the first by permitting clustered evaluation of relational algebra operators, such as combining a join operator with a select operator. The first algorithm utilizes a function filter$_1$ which has signature:

$$\text{filter}_1: \text{HQL expressions} \times \text{ESV} \times \text{DB} \rightarrow (R \cup \text{ESV}).$$

FIG. 5 shows the recursive definition of the filter$_1$ function. On the left side of the equalities in FIG. 5, the symbols u_op and b_op are in the syntax of the relational algebra, and on the right side these symbols indicate the application of algebraic operators to relations. The function filter$_1$ is constructed such that evaluating filter$_1$(Q, E) in state DB yields [Q] apply(DB, E)). The function filter$_1$ in effect performs a depth-first traversal of the syntax tree of an ENF query Q. Upon encountering a when node, the right child is processed before the left child. The definition of filter$_1$ on individual relation names performs the actual "filtering" by an xsub-value. The action of the filter$_1$ function on the when construct has the effect of smashing together all of the xsub-values that affect a given subquery.

The first exemplary evaluation algorithm, designated HQL-1, may be summarized as follows. Given an HQL query Q in ENF and a database state DB, the value Q in DB is obtained by evaluating filter$_1$ (Q, { }), that is, the function filter$_1$ of FIG. 5 applied to Q and the empty xsub-value. A possible weakness of the above version of the HQL-1 algorithm is that it generally does not permit grouping of relational algebra operators into single physical operations, as frequently occurs in traditional optimizers for relational algebra queries. For example, the above HQL-1 algorithm would generally not permit the grouping of a join operator and a select operator in a query such as R $\bowtie$ $\sigma$(S). However, the HQL-1 algorithm may be modified to permit certain types of grouping. For example, assume that T represents the syntax tree of the following query:

$$Q = (Q_1 \text{ when } \epsilon_1) \bowtie (R \bowtie \sigma(Q_2 \text{ when } \epsilon_2)).$$

A collapse operator to be defined in detail below may be used to construct a tree collapse(T) having a root v that is labeled by $S_1 \bowtie (R \bowtie \sigma(S_2))$ and has three children. The first child will be the root of the tree of $Q_1$ when $\epsilon_1$, the second child will be the root of the tree of $Q_2$ when $\epsilon_2$, and the third child will have label R.

As noted above, the collapse operator maps ENF syntax trees into a variant of ENF syntax trees. In this variant, nodes can be labeled by relation names in Z, by 'when', by '{ }' and by relational algebra queries of the form Q[$S_1, \ldots, S_k$, $R_1, \ldots R_m$], where $R_1, \ldots, R_m$ are distinct relation names in Z and $S_1, \ldots, S_k$ are "new" relation names. A node labeled Q[$S_1, \ldots, S_k, R_1, \ldots, R_m$] will have k+m children. Below the first k children will be subtrees with a root node labeled by 'when', and the remaining m children will be leaves, labeled by $R_1, \ldots, R_m$, respectively. The definition of the collapse operator is recursive on the structure of ENF syntax trees. If the ENF syntax tree has the structure '$T_0$ when $\{T_1/R_1, \ldots, T_n/R_n\}$', then collapse(T) may be defined as:

$$\text{collapse}(T_0) \text{ when } \{\text{collapse}(T_1)/R_1, \ldots, \text{collapse}(T_n)R_n\}.$$

If the ENF syntax tree T is a single node labeled by $R \in Z$, then collapse(T)=T. As the final case, assume that T is an ENF syntax tree with root node v labeled by a relational algebra operator. Let $u_1, \ldots, u_k$ be the nodes below v whose labels are relation names or when, such that each node between v and $u_i$ is labeled by a relational operator. Let $T_1, \ldots, T_m$ be the subtrees below the nodes among $u_1, \ldots, u_k$ that have label when, and let $R_1, \ldots, R_k$ be the relation names occurring as labels of $u_1, \ldots, u_n$. Let $Q_v[S_1, \ldots, S_m, R_1, \ldots, R_k]$ denote the relational algebra query that corresponds to the subtree of T with root v and leaves $u_1, \ldots, u_n$, where $S_1, \ldots, S_m$ are new relation names corresponding to subtrees $T_1, \ldots, T_m$. Then collapse(T) is the tree that has root v, where the label of v is $Q_v[S_1, \ldots, S_m, R_1, \ldots, R_k]$, v has m+k children, the first m children are the roots of collapse($T_1$), . . . , collapse($T_m$), respectively, and the latter k children are leaves and are labeled by $R_1, \ldots, R_k$, respectively.

FIG. 6 shows the definition of another filter function $filter_2$ suitable for use in the second of the two hypothetical query evaluation algorithms noted above. The function $filter_2$ is essentially the same as the previously-described function $filter_1$, but modified to process collapsed ENF syntax trees. To describe $filter_2$, it may be useful to first view $filter_1$ as a mapping involving subtrees of ENF syntax trees, rather than expressions from HQL. The function $filter_2$ is identical to the function $filter_1$ except for its behavior on nodes with labels of the form Q [$S_1 \ldots, S_m R_1 \ldots R_k$]. The exemplary function $filter_2$ shown for xsub-value E in FIG. 6 assumes that v is such a label, with subtrees $T_1, \ldots, T_m$ below the first m children. The function eval_filter_x in FIG. 6 can be based on any conventional algorithm for evaluating relational algebra queries, with the modification that each relation $R_i$ mentioned explicitly in Q[$S_1, \ldots, S_m, R_1, \ldots, R_k$] is filtered by xsub-value E, in a manner analogous to the action of function $filter_1$ on individual relation names. Importantly, the function eval_filter_x as applied in $filter_2$ may be used to cluster several relational operators together into a single physical operator. The function $filter_2$ may form the basis of the second algorithm, denoted HQL-2, in which the value of an ENF query Q with syntax tree T in a database state DB is computed as $filter_2$ (collapse(T), { }). It will be apparent to those skilled in the art that the illustrative algorithms HQL-1 and HQL-2 both exhibit the desirable property of correctness.

The exemplary HQL-2 evaluation algorithm can be generalized to cover delta values. Frequently, the hypothetical changes to a database state specified by a hypothetical update {U} will modify only a small fraction of the state. A delta value is a partial function $\Delta$ that maps relation names in Z to pairs of relations, where the two relations in $\Delta(R)$ have the same arity as R, for each $R \in \text{dom}(\Delta)$. A delta value may be denoted as a set $\Delta = \{<D_1, I_1>/R_1, \ldots, <D_n, I_n>/R_n\}$ of binding pairs, where each $D_i$ and $I_i$ is a physical relation. If $R \in \text{dom}(\Delta)$ and $\Delta(R) = <D, I>$, $<D, I>$, D may be denoted by $R_\Delta^-$ and I may be denoted by $R_\Delta^+$. Also, if $R \notin \text{dom}(\Delta)$, then $R_\Delta^- = R_\Delta^+ = 0$. The family of delta values is denoted by DV. Additional details regarding delta values may be found in, for example, S. Ghandeharizadeh, R. Hull and D. Jacobs, "Heraclitus: Elevating Deltas to be First-Class Citizens in a Database Programming Language," ACM Trans. on Database Systems, 21(3): 370–426, 1996, and J. Woodfill and M. Stonebraker, "An Implementation of Hypothetical Relations," Proc. of Intl. Conf. on Very Large Databases, pp. 157–165, September 1983. It should be noted that although the above-cited Ghandeharizadeh, Hull and Jacobs reference requires a delta value $\Delta$ to satisfy the condition that for each R, $R R_\Delta^- \cup R_\Delta^+ = 0$, this condition is not a requirement of the evaluation algorithms of the present invention.

One basic operator involving delta values is an apply operator that maps database states and delta values to database states. This apply operator may be defined, by analogy to the apply operator for xsub-values described above, as follows:

$$\text{apply}(DB, \Delta)(R) = ((DB(R) - R_\Delta^-) \cup R_\Delta^+).$$

The use of delta values can significantly improve the performance of the query evaluation algorithms of the present invention relative to the use of xsub-values. Consider as an example the simple hypothetical query Q=(R ⋈ S) when {U}. In accordance with the above-described evaluation algorithm HQL-2, the hypothetical update {U} might first be transformed into an explicit substitution of the form $\epsilon = \{Q_1/R, Q_2/S\}$. If the difference between DB(R) and $[Q_1]$ (DB) is relatively small, for example, about 1% of the size of DB(R), and the same holds true for $Q_2$, algorithm HQL-2 would compute complete values for $[Q_1]$ (DB) and $[Q_2]$ (DB), and then perform the join using these new relations.

A more efficient alternative evaluation algorithm may be implemented in accordance with the invention by using special-purpose operators that essentially combine delta application with relational algebra operators. For example, suppose that in state DB, the delta corresponding to $\epsilon$ is $\Delta$. To compute R ⋈ S when $\epsilon$, one can compute R ⋈ S 'when' $\Delta$ using the join_when operator of the of the above-noted reference on the Heraclitus language. The when operator is placed in quotes because the delta value $\Delta$ is a semantic object rather than a syntactic object. The above algebraic operator takes six physical relations as operands. In particular, join_when(DB(R), DB(S), $R_\Delta^-$, $R_\Delta^+$, $S_\Delta^-$, $S_\Delta^+$) computes the value of.

$$[(DB(R) - R_\Delta^-) \cup R_\Delta^+] \bowtie [(DB(S) - S_\Delta^-) \cup S_\Delta^+]$$

Instead of computing the above value, as most conventional SQL optimizers might, the join_when can be optimized for the case where the delta relations are relatively small. For example, a conventional implementation described in S. Ghandeharizadeh et al., "On Implementing a Language for Specifying Active Database Execution Models," Proc. of Intl. Conf. on Very Large Data Bases, pp. 441–454, 1993, which is incorporated by reference herein, is a variant of the sort-merge algorithm for join. In this variant, all six operands of join_when are sorted, and the merge simultaneously tests for (i) the join condition, (ii) membership in R 'when' $\Delta$, and (iii) membership in S 'when' $\Delta$. For small deltas the cost of evaluating a join under a delta is only more expensive than evaluating the join without the when. As a general rule of thumb, if the delta has size x % of the base relations, then the join_when will take an additional 2x % of time over the time for a join of the base relations. More generally, the two S. Ghandeharizadeh et al. references cited above describe how to use join_when and analogous operators to efficiently evaluate hypothetical queries of the form Q 'when' $\Delta$, where Q is an arbitrarily deep relational algebra query.

The illustrative embodiments of the present invention will use the notation eval_filter_d(Q, $\Delta$) to denote the result of using conventional evaluation algorithms such as those described in the S. Ghandeharizadeh et al. references. It will be assumed without limitation that for each relational algebra query Q and state DB, the result of eval_filter_d(Q, $\Delta$) in DB is equal to $[Q]$ (apply(DB, $\Delta$). There are a number of trade-offs to be made in connection with the selection of a delta value $\Delta$ associated with an explicit substitution $\epsilon$.

One possibility which provides a high degree of precision involves, for each $R \in \text{dom}(\epsilon)$, setting:

$$R_\Delta^- = DB(R) - [\![\epsilon(R)]\!](DB)$$

$$R_\Delta^+ = [\![\epsilon(R)]\!](DB) - DB(R)$$

However, this selection may be prohibitively expensive to evaluate in certain applications. Reduced computation complexity may be achieved by using approximate delta values in the following manner. A delta value $\Delta$ is said to capture xsub-value E in state DB if apply(DB, $\Delta$)=apply(DB, E). As part of the generalization of evaluation algorithm HQL-2 to cover the use of delta values, an approach for building deltas that capture explicit substitutions will be described. In many applications, this approach will be more efficient than the high precision approach previously described.

By analogy to the above-described smash operator for xsub-values, a smash operator is defined for delta values as follows. The smash of delta values $\Delta_1$ and $\Delta_2$, denoted $\Delta_1!\Delta_2$, is that delta value $\Delta$ with domain equal to $\text{dom}(\Delta_1) \cup \text{dom}(\Delta_2)$, and such that:

$$R_\Delta^- = (R_{\Delta_1}^- - R_{\Delta_2}^+) \cup R_{\Delta_2}^-$$

$$R_\Delta^- = (R_{\Delta_1}^+ - R_{\Delta_2}^-) \cup R_{\Delta_2}^+$$

for each R in dom($\Delta$). Let $\epsilon_1$ and $\epsilon_2$ be explicit substitutions and DB a database state. If $\Delta_1$ captures $[\![\epsilon_1]\!]_{xval}$ (DB) in DB and $\Delta_2$ captures $[\![\epsilon_2]\!]_{xval}$ (apply(DB, $\Delta_1$)) in apply(DB, $\Delta_1$), then $\Delta_1!\Delta_2$ captures $[\![\epsilon_1 \# \epsilon_2]\!]_{xval}$ (DB) in state DB. Furthermore, for each relational algebra query Q, $$[\![(Q \text{ when } \epsilon_2) \text{ when } \epsilon_1]\!](DB) = [\![(Q \text{ when } (\epsilon_1 \# \epsilon_2)]\!](DB)$$

$$= \text{result of } eval\_filter\_d(Q, \Delta_1!\Delta_2) \text{ in } DB.$$

This is analogous to the equation presented for explicit substitutions above that relates when and smash, and describes generally how deltas should be combined when evaluating queries under nested when constructs.

An illustrative generalization of the HQL-2 evaluation algorithm to cover the use of delta values will compute delta values based on a sequence of atomic inserts and deletes that make up a hypothetical update. To this end, the notation for ENF given above will be modified in the following manner. An HQL query is in modified ENF (mod-ENF) if it satisfies the definition of ENF given previously, except that instead of explicit substitutions, all hypothetical updates present in the query have the form $\{A_1; \ldots; A_n\}$, where each $A_1$ is an atomic insert or delete. The generalization of the HQL-2 algorithm to cover the use of delta values is referred to as the HQL-3 algorithm.

FIG. 7 shows a recursively-defined function filter$_3$ which is used in the exemplary HQL-3 algorithm. The function filter$_3$ takes two arguments, the collapse of a mod-ENF syntax tree and a delta value. The hypothetical update A in FIG. 7 ranges over atomic deletes and inserts, and U ranges over update expressions of the form $A_1; \ldots; A_n$, where each $A_i$ is an atomic insert or delete. Of particular interest is the treatment by filter$_3$ of hypothetical updates of the form $\{U\}$, where $U=A_1; \ldots; A_n$ and each $A_i$ is an atomic insert or delete. It can be verified that if $\Delta$ captures xsub-value E in state DB and $\epsilon'$ is an explicit substitution equivalent to $\{U\}$, then filter$_3(\{U\},\Delta)$ captures the xsub-value $[\![\epsilon']\!]_{x\_val}$ (apply(DB, E)) in the state apply(DB, E). The algorithm HQL-3 may therefore be stated as follows. Given a mod-ENF query Q with syntax tree T, construct a syntax tree collapse(T), and compute the value of Q in state DB as filter$_3$(collapse(T), { }), that is, the application of filter$_3$ to collapse(T) and the empty delta value. Like the other exemplary algorithms HQL-1 and HQL-2 described above, the HQL-3 algorithm can also be shown to exhibit the property of correctness.

Exemplary algorithms HQL-1 and HQL-2 use xsub-values as concrete, materialized representations of explicit substitutions, and exemplary algorithm HQL-3 uses delta values as concrete, materialized representations of explicit substitutions. A "hybrid xsub/delta value" may be defined as a partial function H that maps relation names in Z to values, where for each R in the domain of H, value H(R) is either a physical relation J with the same arity as R, or a pair <D, I> where both D and I are physical relations having the same arity as R. Hybrid xsub/delta values can also be used as concrete, materialized representations of explicit substitutions, in analogy to xsub-values and delta values. The operations of apply and smash on hybrid xsub/delta values can be defined in analogy with the definitions of those operators for xsub-values and delta values. It will be apparent to those skilled in the art that the techniques of exemplary algorithms HQL-1, HQL-2 and HQL-3 can be used to develop additional algorithms that use hybrid xsub/delta values in place of xsub-values or delta values.

A number of examples will now be provided to illustrate different strategies for evaluating hypothetical queries in accordance with the invention. Consider an application in which queries against many hypothetical states are to be considered and compared. A tree of potential updates could be constructed, where each edge is labeled with a hypothetical update expression. A node v in the tree corresponds to the hypothetical state produced by applying all of the hypothetical update expressions in the path from the root of the tree to the node v. An exemplary query may be of the form:

$$Q' = ((Q_1 \text{ when } \eta_1) - (Q_2 \text{ when } \eta_2)) \text{ when } \eta_3$$

where $Q_1$ and $Q_2$ are relational algebra queries, $\eta_3$ is the hypothetical update expression associated with a path from the root to some node v, and $\eta_1$ and $\eta_2$ are the hypothetical update expressions associated with two possible extensions of this path. The query Q' is thus asking for the difference between the value of $Q_1$ under hypothetical update $\eta_1$ and the value of $Q_2$ under hypothetical update $\eta_2$, assuming the hypothetical update $\eta_3$ has already occurred.

One embodiment of the invention may evaluate the query Q' using an approach which is "lazy" with regard to the evaluation of hypothetical states. This approach could involve building the relational algebra queries $Q_1'$ and $Q_2'$, with the properties that:

$$Q_1' = (Q_1 \text{ when } \eta_1) \text{ when } \eta_3$$

$$Q_1' = (Q_2 \text{ when } \eta_2) \text{ when } \eta_3$$

and then evaluating $Q_1' - Q_2'$. The queries $Q_1'$ and $Q_2'$ can be determined using the explicit substitution framework described above. This will be illustrated using the following query:

$$[((R \bowtie S) \text{ when } \{ins(R, \sigma_{A>30}(S))\}) -$$

$$((R \bowtie S) \text{ when } \{ins(R, \sigma_{A>50}(S))\})] \text{ when } \{del(S, \sigma_{A<60}(S))\}$$

in which R and S have the same arity, $Q_1 = Q_2 = R \bowtie S$, and the join condition is not specified. Note that in the absence of the outer hypothetical update, one would expect the exemplary query to yield the non-empty result $\sigma_{30<A\leq 50}(S) \bowtie S$. The construction of $Q_1'$ will be considered first. The construction process begins with the query:

$$((R \bowtie S) \text{ when } \{ins(R, \sigma_{A>30}(S))\}) \text{ when } \{del(S, \sigma_{A<60}(S))\}.$$

The two hypothetical-state expressions are then replaced using the above-described explicit substitutions, to yield:

$$((R \bowtie S) \text{ when } \{(R \cup \sigma_{A>30}(S)/R\}) \text{ when } \{S - \sigma_{A<60}(S)/S\}.$$

The inner substitution is then applied to the query, resulting in:

$$((R \cup \sigma_{A>30}(S)) \bowtie S) \text{ when } \{S - \sigma_{A<60}(S)/S\}.$$

Applying the second substitution yields:

$$(R \cup \sigma_{A>30}(S - \sigma_{A<60}(S))) \bowtie (S - \sigma_{A<60}(S)) \equiv$$
$$(R \cup \sigma_{A>30}(\sigma_{A\geq 60}(S))) \bowtie (\sigma_{A\geq 60}(S)) \equiv$$
$$(R \cup \sigma_{A\geq 60}(S)) \bowtie (\sigma_{A\geq 60}(S))$$

The query $Q_2'$ can be transformed in an analogous manner to:

$$(R \cup \sigma_{A\geq 60}(S)) \bowtie (\sigma_{A\geq 60}(S))$$

It follows that the original exemplary query is equivalent to the empty query $\phi$. Importantly, this analysis can be performed without reference to the underlying database state.

Other embodiments of the invention may utilize hybrids of "eager" and "lazy" approaches to evaluate hypothetical queries. For example, suppose that in the above query Q' the hypothetical state of $\eta_3$ gives new values for relations R and S, and that the subqueries $Q_1$ and $Q_2$ involve many occurrences of R and S. Suppose further that, for i=1 and 2, the relation names affected by $\eta_i$ occur only once or twice in $Q_i$. In this case it may be more efficient to use an evaluation strategy guided by:

$$(Q_1''\text{-}Q_2'') \text{ when } \eta_3$$

where $Q_i'' \equiv (Q_i \text{ when } \eta_i)$, such that $\eta_3$ is evaluated eagerly, and $\eta_1$ and $\eta_2$ are evaluated lazily.

The following two examples illustrate optimizations based on the fact that hypothetical states can be viewed as substitutions in accordance with the present invention. The first example is based on composing substitutions, and the second is based on binding removal in substitutions. In the first example, multiple queries are asked against the same hypothetical state. For example, the query:

$$\hat{Q} \text{ when } \{ins(R, \sigma_{A>30}(S))\} \text{ when } \{del(S, \sigma^{A<60}(S))\}$$

may be asked for many queries $\hat{Q}$. As in the previous example, such queries could be evaluated by converting to explicit substitutions such as:

$$(\hat{Q} \text{ when } \{R \cup \sigma_{A>30}(S)/R\}) \text{ when } \{S-\sigma_{A<60}(S)/S\}.$$

and then applying the two substitutions into $\hat{Q}$. However, it might be more efficient to compute the composition of the two substitutions, and use that composition repeatedly. As described in detail above, the composition operator '#' is used to represent the composition of hypothetical-state expressions:

$$\hat{Q} \text{ when } [\{S-\sigma_{A<60}(S)/S\} \# \{R \cup \sigma_{A>30}(S)/R\}],$$

and then expanding the definition of composition to obtain:

$$\hat{Q} \text{ when } \{\sigma_{A\geq 60}(S)/S, R \cup \sigma_{A>30}(S-\sigma_{A<60}(S))/R\},$$

and finally using algebraic simplification to arrive at:

$$\hat{Q} \text{ when } [\{\sigma_{A\geq 60}(S)/S, R \cup \sigma_{A\geq 60}(S)/R\}.$$

In accordance with a "lazy" approach, the new substitution can be applied to each of the queries $\hat{Q}$. This substitution remains valid even if the underlying database state is changed. A hybrid approach might utilize an "eager" strategy to partially materialize the substitution, using it to filter evaluation of the various $\hat{Q}$ queries. More generally, assume that in a single state DB the expression:

$$((\hat{Q}_1 \text{ when } \hat{\eta}_1)\text{-}(\hat{Q}_2 \text{ when } \hat{\eta}_2) \text{ when } \eta_3$$

is to be evaluated with many different values for $\hat{Q}_1, \hat{Q}_2, \hat{\eta}_1$ and $\hat{\eta}_2$. In this case it may be more efficient to materialize part of $\eta_3$ for use with $\hat{Q}_1$ when $\hat{\eta}_1$, and to materialize part of $\eta_3 \# \eta_2$ for use with $\hat{Q}_2$.

The next example uses the technique of binding removal in substitutions. Suppose that queries of the form:

$$\hat{Q} \text{ when } \{ins(R, \sigma_p(S)); del(S, \sigma_q(R)), ins(T, \pi_A R)\}$$

are to be asked for many different $\hat{Q}$. Direct application of the techniques used in the previous example suggests that the substitution:

$$\{R \cup \sigma_p(S)/R\} \# \{S-\sigma_q(R)/S\} \# \{T \cup \pi_A(R)/T\}$$

should be computed. Suppose however that none of the queries $\hat{Q}$ will involve relation name S. This situation permits computation of the full composition to be avoided. In particular, the middle substitution can be dropped from consideration, in accordance with the following classical equivalence for substitutions:

$$sub(E, \sigma) \equiv sub(E, [\sigma-\{t/v\}])$$

where $\sigma$ is a substitution, t/v is a binding in $\sigma$, and variable v is not free in expression E. In the case of eager evaluation, this will reduce work on the underlying data, and in the case of lazy evaluation this will reduce work in the optimizer.

The final example shows that transforming to a fully lazy equivalent of an hypothetical query Q can lead to an exponential blow-up in certain situations. This is one motivation for exploring both lazy and hybrid lazy-eager forms of evaluation of hypothetical queries. It will also be demonstrated that the blow-up may be avoided in practice. Consider the query:

$$Q = ((\ldots((R_0 \text{ when } \{E_1(R_1)/R_0\}) \text{ when } \{E_2(R_2)/R_1\}) \text{ when }$$
$$\ldots). \text{ when } \{E_n(R_n)/R_{n-1}\})$$

where for each i, $E_i(R_i)$ is a relational algebra query whose only relation name is $R_i$. In the following, the intended arities of relations can be inferred from the context. Note that expression 'Q' is linear in n, and that the fully lazy equivalent of Q is:

$\hat{Q}E_1(E_2(\ldots(E_n(R_n))\ldots))$.

Suppose that expression $E_i(R_i)$ is $R_i \times R_i$ for each i. Then $\hat{Q}$ is exponential in n. Also, if the relations $R_i$ are non-empty, then the value of red(Q) is also exponential in n, leading to an exponential blow-up. In some cases, this situation can be avoided using relational algebra rewriting. For example, suppose that $E_i(R_i)=R_i \times R_i$ for each i except for one j, where $E_j(R_j)=R_j-R_j$. Then the size of the query $\hat{Q}$ is exponential in n, but its value is $\phi$, the empty query. This equivalence can be found using the equational theory described in detail above. In particular, an algebra rewriting rule can be used to replace $\{R_j-R_j/R_{j-1}\}$ by $\{\phi/R_{j-1}\}$. Several applications of binding-removal, as in the previous example, will then yield:

$$Q \equiv ((\ldots((R_0 \text{ when } \{E_1(R_1)/R_0\}) \text{ when } \{E_2(R_2)/R_1\}) \text{ when}$$
$$\ldots). \text{ when } \{\phi/R_{j-1}\})$$

A series of compositions and binding-removals can then be used to obtain $Q \equiv R_0$ when $\{\phi/R_{j-1}\}$, which avoids the above-noted exponential blow-up. It should be noted that if each $E_i$ has the form $\pi_{A0\ldots Ai-1}(\sigma_{Ai<0} R_i) \cup \pi_{A0\ldots Ai-1}(\sigma_{Ai>0} R_i)$, and these intersections are small, a hybrid lazy-eager evaluation strategy may be most efficient.

It is apparent from the above description that the present invention provides a framework for optimizing hypothetical queries, and supports a broad spectrum of implementation strategies from hybrid eager-lazy strategies to purely lazy strategies. An important aspect of the framework is a set of rewriting rules for processing hypothetical queries using explicit substitutions. The invention may also be combined with techniques for estimating the cost of execution plans involving xsub-values and delta values, heuristics whereby optimizers can reduce the space of queries that will be considered for execution, and techniques for evaluating sequences of closely-related hypothetical queries. Exemplary heuristics for query space reduction in an optimizer are described in G. Graefe and D. J. DeWitt, "The EXODUS optimizer generator," Proc. ACM SIGMOD Symp. on the Management of Data, pp. 160–172, 1987, and G. Graefe, "Query Evaluation Techniques for Large Databases," ACM Computing Surveys, 25(2):73–170, 1993, which are incorporated by reference herein. The framework may be extended, for example, to query languages that include bags and aggregation, and to update languages that include constructs such as conditionals, procedures, temporary tables, and aborting constructs. Such constructs generally do not extend the expressive power of the update language, but do dramatically increase the conciseness with which database management programs can be written. It should also be noted that the invention is applicable to constructs of the conventional Heraclitus language other than those described above, and to constructs of numerous other database programming languages. For example, the keyword when can be applied to hypothetical-state expressions on the left, that is, of the form $\eta_1$ when $\eta_2$.

The above-described embodiments of the invention are intended to be illustrative only. Numerous alternative embodiments may be devised by those skilled in the art without departing from the scope of the following claims.

What is claimed is:

1. A method of evaluating a hypothetical query in a database system, the method comprising the steps of:
   applying to the hypothetical query one or more algebraic equivalences involving explicit substitutions in order to generate at least one query which is equivalent to the hypothetical query, wherein each of at least a subset of the explicit substitutions represents a hypothetical database state change; and
   directly evaluating the equivalent query.

2. The method of claim 1 wherein the applying step includes applying to the hypothetical query algebraic equivalences involving explicit substitutions in order to generate a set of additional queries each of which is equivalent to the hypothetical query.

3. The method of claim 2 further including the steps of:
   estimating an amount of time it would take to directly evaluate each of the queries in the set of additional queries; and
   selecting a particular query from the set of additional queries which has the lowest estimated evaluation time for direct evaluation in the directly evaluating step.

4. The method of claim 1 wherein the hypothetical query includes at least one construct substantially equivalent to a when construct, and the at least one equivalent query includes no construct substantially equivalent to a when construct.

5. The method of claim 1 wherein the hypothetical query is in a normal form suitable for direct evaluation, wherein the normal form indicates that one or more hypothetical state expressions of the query correspond to explicit substitutions.

6. The method of claim 5 wherein the normal form indicates that the query does not utilize a composition operator.

7. The method of claim 1 wherein the at least one equivalent query is representative of a lazy evaluation strategy and includes no hypothetical state expressions.

8. The method of claim 1 wherein the at least one equivalent query is representative of a hybrid lazy-eager evaluation strategy.

9. The method of claim 1 wherein the directly evaluating step includes the step of converting at least one of the explicit substitutions into at least one value.

10. The method of claim 9 wherein the value is an xsub-value E that maps relation names into relations, where a relation E(R) has the same arity as a relation name R for each $R \cup \text{dom}(E)$.

11. The method of claim 10 wherein the xsub-value is a set $E=\{J_1/R_1, \ldots J_n/R_n\}$ of binding pairs, where each $J_i$ is a physical relation.

12. The method of claim 9 wherein the value is a delta value $\Delta$ that maps relation names into pairs of relations, where a pair of relations in $\Delta(R)$ has the same arity as a relation name R, for each $R \in \text{dom}(\Delta)$.

13. The method of claim 12 wherein the delta value is a set $\Delta=\{<D_1, I_1>/R_1, \ldots <D_n, I_n>/R_n\}$ of binding pairs, where each $D_i$ and $I_i$ is a physical relation.

14. The method of claim 9 wherein the value is a hybrid of an xsub-value and a delta value.

15. The method of claim 1 wherein the directly evaluating step includes filtering the equivalent query through a value representative of one of the explicit substitutions.

16. The method of claim 15 wherein the value is an xsub-value E that maps relation names into relations, where a relation E(R) has the same arity as a relation name R for each $R \in \text{dom}(E)$.

17. The method of claim 15 wherein the value is a delta value $\Delta$ that maps relation names into pairs of relations, where a pair of relations in $\Delta(R)$ has the same arity as a relation name R, for each $R \in \text{dom}(\Delta)$.

18. The method of claim 15 wherein the value is a hybrid of an xsub-value and a delta value.

19. The method of claim 1 wherein the applying step includes applying an algebraic equivalence that transforms an explicit substitution into an equivalent explicit substitution.

20. The method of claim 1 wherein the applying step includes applying an algebraic equivalence that transforms an explicit substitution into a hypothetical state expression which is not an explicit substitution.

21. The method of claim 1 wherein the applying step includes applying an algebraic equivalence that transforms a hypothetical state expression which is not an explicit substitution into an explicit substitution.

22. An apparatus for use in evaluating a hypothetical query in a database system, the apparatus comprising:

a memory for storing at least one data item referenced by the hypothetical query; and a processor coupled to the memory and operative to (i) apply to the hypothetical query one or more algebraic equivalences involving explicit substitutions in order to generate at least one query which is equivalent to the hypothetical query, wherein each of at least a subset of the explicit substitutions represents a hypothetical database state change, and (ii) directly evaluate the equivalent query.

23. The apparatus of claim 22 wherein the processor is further operative to apply to the hypothetical query algebraic equivalences involving explicit substitutions in order to generate a set of additional queries each of which is equivalent to the hypothetical query.

24. The apparatus of claim 23 wherein the processor is further operative to estimate an amount of time it would take to directly evaluate each of the queries in the set of additional queries, and to select for direct evaluation a particular query from the set of additional queries with the lowest estimated evaluation time.

25. The apparatus of claim 22 wherein the hypothetical query includes at least one construct substantially equivalent to a when construct, and the at least one equivalent query includes no construct substantially equivalent to a when construct.

26. The apparatus of claim 22 wherein the hypothetical query is in a normal form suitable for direct evaluation, wherein the normal form indicates that one or more hypothetical state expressions of the query correspond to explicit substitutions.

27. The apparatus of claim 26 wherein the normal form indicates that the query does not utilize a composition operator.

28. The apparatus of claim 22 wherein the at least one equivalent query is representative of a lazy evaluation strategy and includes no hypothetical state expressions.

29. The apparatus of claim 22 wherein the at least one equivalent query is representative of a hybrid lazy-eager evaluation strategy.

30. The apparatus of claim 22 wherein the processor is further operative to convert at least one of the explicit substitutions into at least one value.

31. The apparatus of claim 30 wherein the value is an xsub-value E that maps relation names into relations, where a relation E(R) has the same arity as a relation name R for each $R \in \text{dom}(E)$.

32. The apparatus of claim 31 wherein the xsub-value is a set $E=\{J_1/R_1, \ldots, J_{Rn}\}$ of binding pairs, where each $J_i$ is a physical relation.

33. The apparatus of claim 30 wherein the value is a delta value $\Delta$ that maps relation names into pairs of relations, where a pair of relations in $\Delta(R)$ has the same arity as a relation name R, for each $R \in \text{dom}(\Delta)$.

34. The apparatus of claim 33 wherein the delta value is a set $\Delta=\{<D_1, I_1>/R_1, \ldots, <D_n, I_n>/R_n\}$ of binding pairs, where each $D_i$ and $I_i$ is a physical relation.

35. The apparatus of claim 30 wherein the value is a hybrid of an xsub-value and a delta value.

36. The apparatus of claim 22 wherein the processor directly evaluates the equivalent query by filtering the equivalent query through a value representative of one of the explicit substitutions.

37. The apparatus of claim 36 wherein the value is an xsub-value E that maps relation names into relations, where a relation E(R) has the same arity as a relation name R for each $R \in \text{dom}(E)$.

38. The apparatus of claim 36 wherein the value is a delta value $\Delta$ that maps relation names into pairs of relations, where a pair of relations in $\Delta(R)$ has the same arity as a relation name R, for each $R \in \text{dom}(\Delta)$.

39. The apparatus of claim 36 wherein the value is a hybrid of an xsub-value and a delta value.

40. The apparatus of claim 22 wherein the processor is further operative to apply an algebraic equivalence that transforms an explicit substitution into an equivalent explicit substitution.

41. The apparatus of claim 22 wherein the processor is further operative to apply an algebraic equivalence that transforms an explicit substitution into a hypothetical state expression which is not an explicit substitution.

42. The apparatus of claim 22 wherein the processor is further operative to apply an algebraic equivalence that transforms a hypothetical state expression which is not an explicit substitution into an explicit substitution.

43. An apparatus for evaluating a hypothetical query in a database system, the apparatus comprising:

means for applying to the hypothetical query one or more algebraic equivalences involving explicit substitutions in order to generate at least one query which is equivalent to the hypothetical query, wherein each of at least a subset of the explicit substitutions represents a hypothetical database state change; and means for directly evaluating the equivalent query.

44. The apparatus of claim 43 wherein the applying means is operative to apply to the hypothetical query algebraic equivalences involving explicit substitutions in order to generate a set of additional queries each of which is equivalent to the hypothetical query.

45. The apparatus of claim 44 further including:

means for estimating an amount of time it would take to directly evaluate each of the queries in the set of additional queries; and means for selecting a particular query from the set of additional queries which has the lowest estimated evaluation time for direct evaluation.

46. The apparatus of claim 43 wherein the hypothetical query includes at least one construct substantially equivalent to a when construct, and the at least one equivalent query includes no construct substantially equivalent to a when construct.

47. The apparatus of claim 43 wherein the hypothetical query is in a normal form suitable for direct evaluation, wherein the normal form indicates that one or more hypothetical state expressions of the query correspond to explicit substitutions.

48. The apparatus of claim 47 wherein the normal form indicates that the query does not utilize a composition operator.

49. The apparatus of claim 43 wherein the at least one equivalent query is representative of a lazy evaluation strategy and includes no hypothetical state expressions.

50. The apparatus of claim 43 wherein the at least one equivalent query is representative of a hybrid lazy-eager evaluation strategy.

* * * * *